July 17, 1928.  1,677,131
L. M. COLE ET AL
MACHINE TOOL FOR BORING AND TURNING IRREGULAR SURFACES
Filed Oct. 10, 1927   3 Sheets-Sheet 1
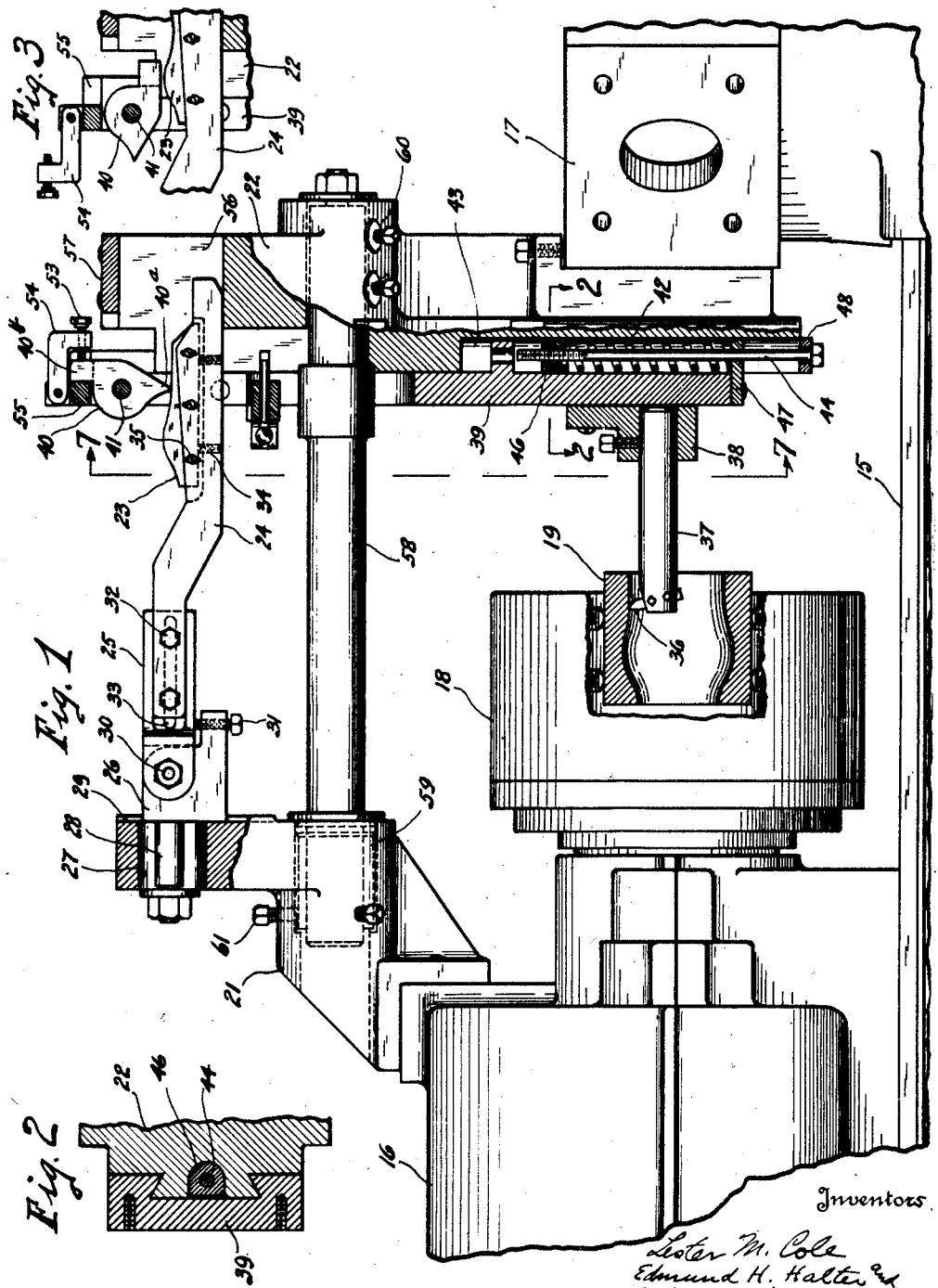

July 17, 1928.
L. M. COLE ET AL
1,677,131
MACHINE TOOL FOR BORING AND TURNING IRREGULAR SURFACES
Filed Oct. 10, 1927    3 Sheets-Sheet 2
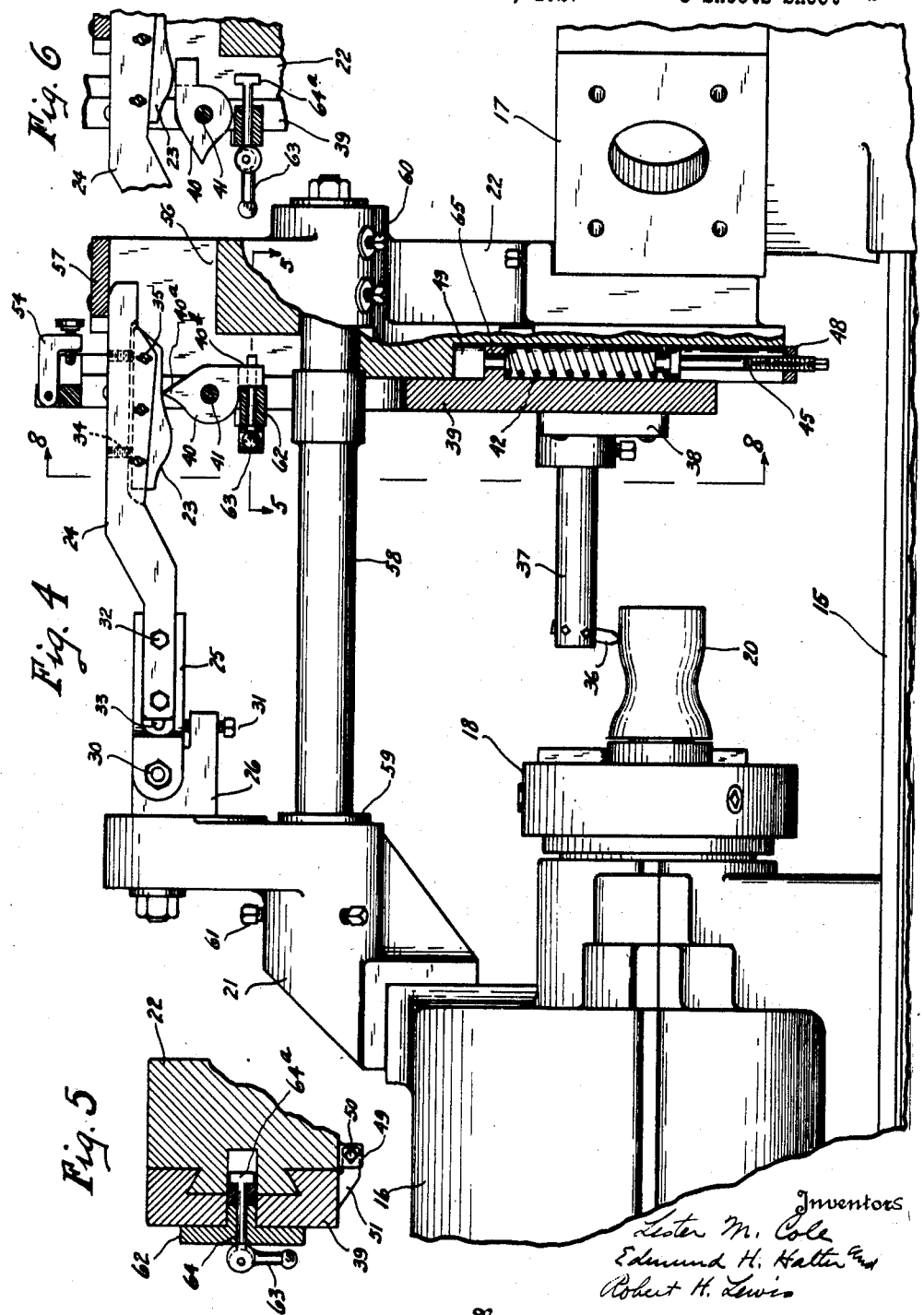

July 17, 1928.
L. M. COLE ET AL
1,677,131
MACHINE TOOL FOR BORING AND TURNING IRREGULAR SURFACES
Filed Oct. 10, 1927   3 Sheets-Sheet 3
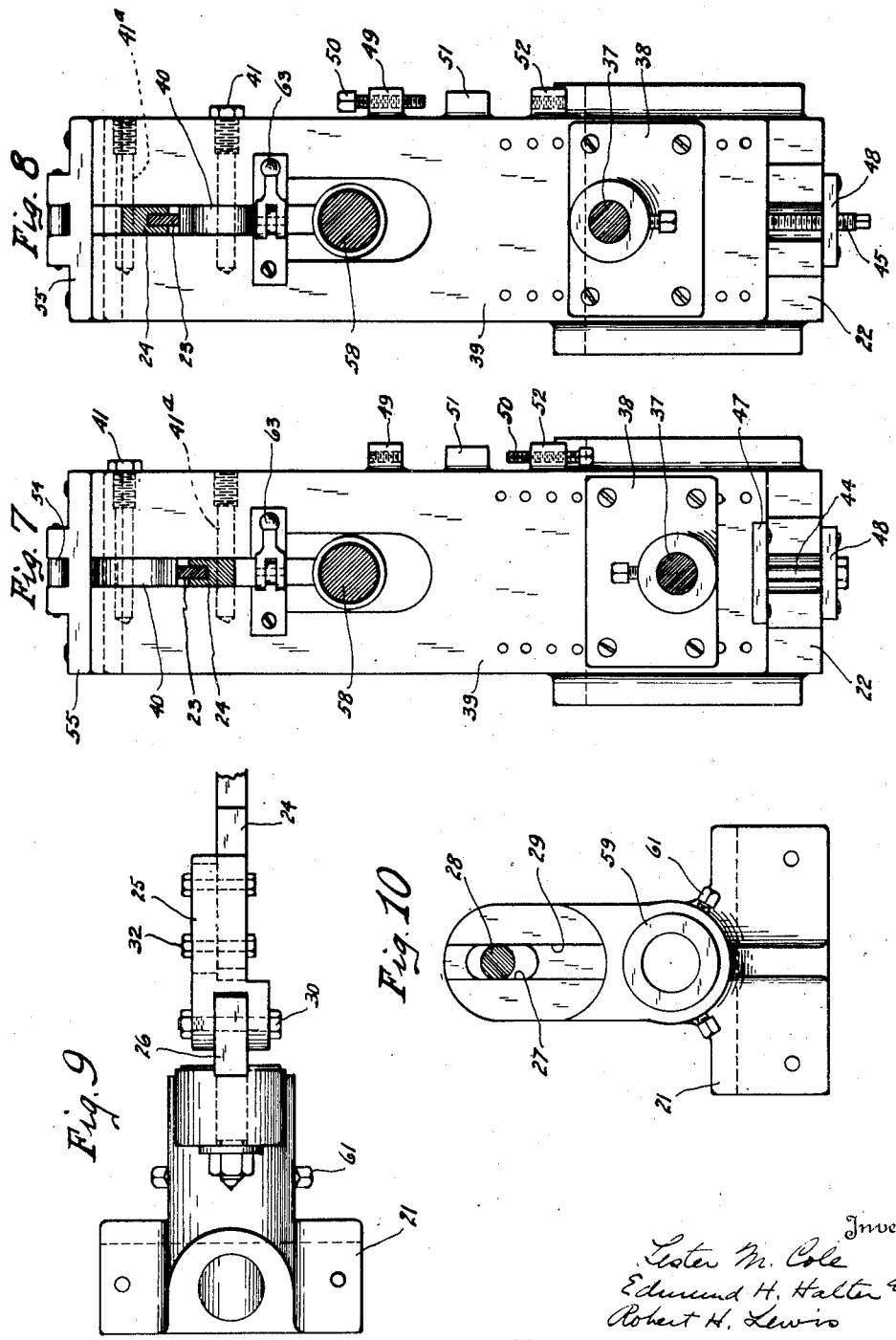
Inventors
Lester M. Cole
Edmund H. Halter
Robert H. Lewis
By Lewis, Hudson & Kent
Attorneys Patented July 17, 1928.

1,677,131

UNITED STATES PATENT OFFICE.

LESTER M. COLE, OF CLEVELAND HEIGHTS, EDMUND H. HALTER, OF MAPLE HEIGHTS, AND ROBERT H. LEWIS, OF CLEVELAND, OHIO, ASSIGNORS TO THE WARNER & SWASEY COMPANY, OF CLEVELAND, OHIO, A CORPORATION OF OHIO.

MACHINE TOOL FOR BORING AND TURNING IRREGULAR SURFACES.

Application filed October 10, 1927. Serial No. 225,271.

This invention relates to machine tools or to an attachment for machine tools, the purpose of which is to bore or turn surfaces other than cylindrical ones.

The main object of the invention is to provide a construction by which a great variety of shapes can be bored or turned and which is capable of being readily converted from a set-up for boring to one for turning and vice versa, in which case the internally bored surface may or may not be the counterpart of the externally turned surface.

Further, the invention aims to accomplish the desired results by an attachment including a pair of separate brackets, one adapted to be attached to the head and the other to a slide of a machine tool, such as a lathe, one of the brackets serving to support the tool and the other a cam engageable with a follower on the tool supporting member, the whole being so constructed as to obtain the feature of rigidity with resulting accuracy.

A still further object is to provide a follower so constructed and mounted that when the boring or turning cut is completed it can be caused to disengage the cam so as to permit a movement of the tool carrying member in a direction to relieve the tool from the work so that the tool can be retracted without danger of scoring the work.

Further, the invention aims to provide a construction wherein the follower by its engagement with the cam resists not only the pressure of the work on the tool but of a spring acting upon a movable tool holding member such as a slide so that when the follower is caused to be disengaged from the cam on the completion of the cut the spring acting on the movable tool holding member will immediately move the tool from the work.

A still further object is to construct the cam and its holder so that they are susceptible of a variety of adjustments which are an important factor in the attainment of extreme accuracy.

The above and other objects are attained by the present invention which will be described in the specification and set forth in the appended claims.

In the accompanying sheets of drawings wherein there is illustrated the preferred embodiment of the invention with the latter arranged both for boring and for turning, Fig. 1 is a side elevation of a portion of a machine tool, such as a turret lathe, with our attachment in place thereon for boring, parts being in section; Fig. 2 is a detail sectional view substantially along the line 2—2 of Fig. 1; Fig. 3 is a detail sectional view showing the follower disengaged from the cam to relieve the tool from the work and permit the tool to be retracted; Fig. 4 is a view similar to Fig. 1 but with the parts arranged for turning instead of boring; Fig. 5 is a detail sectional view substantially along the line 5—5 of Fig. 4; Fig. 6 is a view similar to Fig. 3 showing the follower disengaged from the cam when the parts are employed for turning, as illustrated in Fig. 4; Fig. 7 is a sectional view substantially along the line 7—7 of Fig. 1; Fig. 8 is a similar view substantially along the line 8—8 of Fig. 4; Fig. 9 is a top plan view showing the major portion of the cam support; and Fig. 10 is a front face view of the bracket which supports the cam holder.

Our invention may be embodied in a special machine adaptable for the purposes mentioned, but, as already stated, it is preferably in the form of an attachment for a standard machine tool, such as a turret lathe, and it is so shown in the drawings wherein 15 represents the bed of the lathe, 16 the head, and 17 a slide, in this instance a turret slide, movable on the ways of the bed toward and from the head. The head will have the usual rotary spindle which is provided with a suitable chuck 18 for supporting the work piece which, in Fig. 1 illustrates the set-up for the boring operation, is designated 19, and which in Fig. 4, which illustrates the set-up for the turning operation, is indicated at 20. The slide 17 is, of course, adapted to be moved back and forth toward and from the head by the standard slide moving mechanism and the turret may be indexed by any of the usual means, this being of utility when and if different faces of the turret are equipped with tools other than the ones instrumental in the boring or turning operations for which the present invention is adapted, or with separate tool assemblies for making roughing and finishing cuts.

When the invention is in the form of an attachment, as herein contemplated, it comprises two brackets, one of which is designated 21 and may be referred to as the cam supporting bracket, and the other of which is designated 22 and may be termed the tool supporting bracket. The former is fastened to the upper portion of the head 16 of the lathe and the latter to the tool slide or to one face of the turret thereof, as indicated in Figs. 1 and 4.

Referring now to the cam and the means for supporting it, this cam, which is designated 23, is in the form of a normally stationary strip one edge of which is adapted to be engaged by the follower to be referred to and has a contour which corresponds to the contour of the surface to be bored or turned. In Fig. 1 it is the upper face of the cam which is engaged by the follower since the boring operation is to be performed, and in Fig. 4 it is the lower face which is engaged by the follower, for, with the set-up shown in this figure turning is to be performed. The cam 23 is adjustably secured to a cam holder 24 which in turn is adjustably secured to a cam arm 25 which in turn is pivoted to a cam block 26 adjustably secured to the cam bracket 21. The adjustment of the block 26 with reference to the bracket 21 which supports it is accomplished by providing in the upper part of the bracket an elongated slot 27 which slot extends entirely through the upper part of the bracket, as illustrated in Figs. 1 and 10. The block 26 has a stem 28 which extends through the slot and the rear end thereof is provided with a nut and washer by which the block may be clamped in place on the front side of the bracket. The front face of the bracket is provided with a vertical groove indicated at 29, this groove being of shallow depth and having a width equal to the width of the cam block which extends into the groove, the latter constituting a guide for facilitating the up and down adjustment of the block and for holding it against turning movement on the bracket.

The rear end of the cam arm 25 is pivoted to the block by a pivot bolt 30 and the forward part of the block has an extension carrying a vertical set-screw 31 on the upper end of which the cam arm is adapted to seat. Obviously, by adjusting this set-screw the arm 25 and the cam 23 and its holder 24 can be rocked about the axis of the pivot bolt 30 to support it in operative position and to permit it to be swung to inoperative position. The cam support 24 is secured to the cam arm 25 for forward and rearward adjustment, and in this instance this is accomplished by providing on one side of the cam arm 25 a groove which receives the inner or rear portion of the holder with a sliding fit, the groove extending longitudinally of the arm, and the holder is secured in any desired position of adjustment in the groove by means of a pair of horizontally disposed bolts 32 extending through a slot 33 in the base of the groove of the arm.

The cam 23 is seated in a groove formed on one edge of the cam holder 24, the same being the top edge when the attachment is used for boring (Fig. 1) and the bottom edge when it is used for turning (Fig. 4). The inner longitudinal edge rests upon the ends of a pair of set-screws 34 extending through the base of the groove, and the cam is held at a predetermined position or height in the groove by a series of laterally disposed screws 35 extending through the cam and through elongated slots formed in the slide of the cam holder.

It will be observed, therefore, that the cam 23 is adjustably supported on the holder, and that the cam support is composed of three relatively adjustable parts 24, 25 and 26, constituting a unit which can be adjusted in its entirety in the cam supporting bracket 21. It will be apparent that by the various adjustments which can be given to the parts 23, 24, 25 and 26 the cam can be positioned properly with reference to the center line of the machine and also take care of varying lengths of work and varying diameters of work. At this point it might be mentioned that our invention has found great utility in the production of bottle molds, such as indicated in Fig. 1, and in work of this kind it is very desirable that the size of the opening which is bored in the mold be accurate to an exceedingly small fraction of an inch to control the fluid content of bottles which are adapted to be molded in the mold. This can be adjusted very accurately by slightly changing the position of the cam in the cam holder 24.

Taking up next the tool holding part of the attachment, the boring and turning tool is here indicated at 36, the tool being in each instance supported by a tool holding bar 37 secured to a holder 38 in turn secured to the front face of a slide 39 adapted for up and down movement on the forward face of the bracket 22, the slide 39 and the bracket 22 preferably having a dovetailed sliding connection indicated in Figs. 2 and 5.

The follower which engages the cam 23 is shown at 40, this follower having practically the equivalent of a knife edge 40ª which engages the cam, this knife edge bearing down upon the top of the cam for the boring operation and bearing up against the bottom of the cam for the turning operation.

The follower is preferably in the form of a pivoted member, being mounted for rocking movement through the medium of a bearing pin 41, the follower being arranged in a vertical slot in the upper part of the slide 39, this bearing pin being directly in line with the knife edge so that the thrust is transmitted direct from the knife edge to the pin which is above the knife edge for boring and below it for turning. To admit of the reversal of the position of the follower, the upper part of the slide is provided with two openings 41ª to accommodate the bearing pin 41 so that when it is desired to change the follower from boring position to turning position, or vice versa, the pin is withdrawn from one socket, then it is inserted in the other socket to hold the follower in the position necessary for the particular cutting operation. These sockets, it will be observed from Figs. 1, 4, 7 and 8, extend inwardly from one edge of the slide.

In each instance, the follower is held in engagement with the cam surface of the cam by a spring 42 which is located in a vertical groove 43 on the front face of the tool holding bracket 22. There is employed in conjunction with this spring a bolt 44 for the boring operation and a bolt or plunger 45 for the turning operation. As the function of the spring is to pull the tool slide downward during the boring operation, the spring acts between a pair of abutments, one in the form a nut 46 on the bolt and the other in the form of a plate 47 which is secured to the lower side of the slide. The lower part of the bolt passes freely through a threaded hole in a plate 48 which is on the lower side of the bracket 22 beneath the groove 43, the head of the bolt being on the lower side of this plate. The position of the nut 46, when once adjusted on the threaded part of the bolt 44, is fixed, since the shape of the spring groove 43 is such as to prevent the turning of the nut, as illustrated in Fig. 2.

It will be obvious that if the follower is rocked so as to disengage the same from the cam the slide will be pulled downward by the spring so as to disengage the tool 36 from the work piece, the tool 36 engaging the top portion of the recess or opening which is being bored in the work piece 19. This disengagement is caused when the cutting operation is completed so as to relieve the tool from the work and prevent the tool scoring the work as would be the case if the tool were retracted while the point of the tool is engaging the work. This scoring is practically inevitable unless the tool is relieved from the work because any tool holder has a certain amount of spring which would tend to cause the cutting point of the tool to be kept in contact with the surface cut by the tool during its working stroke. The downward movement of the slide under the action of the spring to relieve the tool from the work must, of course, be limited, and this is preferably done by providing on the edge of the slide a lug 49 adapted to be provided with an adjustable set-screw 50 whose lower end is adapted to engage a lug 51 on the tool holding bracket 22. At this point it might be mentioned that there is a similar lug 52 provided on the edge of the slide, which lug is adapted to receive the set-screw 50 so that its upper end will engage the lug 51 of the bracket 22 when the attachment is set up for turning instead of boring for in that instance the spring 42 moves the tool slide upwardly to relieve the tool from the work, the tool then engaging the top portion of the work piece, as indicated in Fig. 4.

In order that the follower may be held rigidly in operative position either while the tool is boring or when it is turning, the follower is provided with an extension 40ᵇ which is substantially opposite the knife edge 40ª which engages the cam. When the attachment is used for boring, this extension is engaged by a set-screw 53 which is carried at the lower end of an L-shaped clamping link 54, the set-screw engaging the rear face of the extension so as to press the front face firmly and solidly against the rear side of a plate 55 (see Figs. 3 and 7), the plate 55 which is secured to the top of the slide, as best shown in Fig. 7, serving not only to support the clamping link 54 but as a closure for the upper end of the slot formed in the slide to receive the follower, all as clearly illustrated in Fig. 7.

During the boring operation, the parts are in the position shown in Fig. 1, the follower then being rigidly held as illustrated, but when the boring operation is completed the set-screw 53 is backed away sufficiently to permit the clamping link 54 to be swung upward to the position shown in Fig. 3, and after this is done, at the instant that the retracting movement of the tool begins the follower is turned from the position shown in Fig. 1 to the position shown in Fig. 3, and instantly the spring 42 lowers the slide until the lower end of the set-screw 50 engages the lug 51, relieving the tool from the work, there still being a clearance between the back of the follower and the cam as shown in Fig. 3.

The upper part of the tool holding bracket 22 is provided with a slot 56 the top of which is closed by a plate 57. The bottom wall of this slot forms a guide for the lower side of the cam holder 24 during the boring operation, and the lower side of the plate 57 forms a guide for the upper side of the cam holder 24 during the turning operation.

In addition to the guiding action which the tool holding bracket 22 has on the cam and its holding members during the cutting operation of either character, we provide also in the attachment a pilot bar action by which, during the cutting operation, the tool holding bracket and the cam supporting bracket are held in fixed relationship. This is accomplished by securing in one of the brackets, preferably the tool holding bracket, a pilot bar 58 which extends through a relatively wide slot in the tool slide 39 and the free end of which is adapted to have sliding engagement with the other bracket or preferably with a bushing 59 carried by it. Both the pilot bar and the bushing are preferably adjustably mounted substantially as shown in the Drake and Lange Patent No. 1,575,742, granted March 9, 1926, so that the bar and bushing may be given both radial and angular adjustments to bring the axes of the bar and bushing not only in direct alignment with each other but in absolute parallelism with the axis of the machine. For adjustably holding the pilot bar, two pairs of set-screws are preferably employed, two being indicated at 60 in Figs. 1 and 4, and for adjustably supporting the bushing a set of three set-screws 61 is preferably employed.

In the set-up for turning, the clamping link 54 is not utilized, and the follower is held in rigid operative position by clamping the extension 40$^b$ against the rear face of a plate 62 which is secured, as clearly shown in Figs. 5, 7, and 8, against the front face of the slide 39 so as to bridge the upper part of the relatively wide slot which accommodates the pilot bar and the lower part of the relatively narrow slot which receives the follower. Any suitable means which can be readily released can be utilized to clamp the extension 48 of the follower against this plate 62, but in this instance we pivot on the front of the plate a lever 63 which has an eccentric pin connected to a bolt 64 having a T-head 64$^a$ at its inner end, the shank of the bolt passing through a slot in the extension. When the lever occupies the position shown in Fig. 5, the extension of the follower is clamped against the plate 62, but when the lever is turned to an upright position and swung outwardly, the T-portion of the bolt is brought into alignment with the slot and at the same time the extension is released from the head of the bolt sufficiently to permit the follower to swing to the position shown in Fig. 6. In the set-up for turning, the spring 42, as previously stated, presses the slide upwardly, this being important since the point or knife edge of the follower now engages the lower side of the cam. To enable the spring to function in this manner, the bolt 44 and nut 46 are replaced with the bolt 45, this being accomplished by the removal of the plate 47 on the lower end of the slide 39, and with this set-up the upper end of the spring is permitted to engage a lug 65 which projects from the face of the slide into the spring groove 43 and the lower end of the spring is caused to engage the head of the bolt or plunger 45 having a threaded portion engaging the plate 48 at the lower end of the spring groove 43. The lug 65 does not function in the set-up for boring, and it does not interfere with the bolt 44 since the lug has an opening extending therethrough large enough to receive freely the upper end of the bolt 44. Furthermore, in the set-up for turning the plate 47 (used in the set-up for boring) is removed, and further, the position of the tool holder 38 is reversed so that the tool supported at the free end of the bar 37 will engage on top of the work piece, as indicated in Fig. 4, so that the thrust of the work on the tool and the pressure of the spring 42 will act in conjunction with each other to hold the follower up against the lower side of the cam, and when the turning cut is completed the release of the follower by manipulating the lever 63 in the manner already explained enables the spring to move the slide upwardly until the set-screw 50 now placed in the lower lug 52 of the slide engages the lug 51 on the tool holding bracket 22, thus relieving the tool from the work as in the first instance.

The tool slide 39 is preferably provided with two vertically disposed rows of threaded openings to accommodate the screws which hold the tool holder to the slide so that the holder can be positioned wherever desired along the length of the slide to accommodate work pieces of different diameters, it being understood that the fine adjustment necessary to accurately machine any particular work piece to the desired size or diameter is accomplished by adjusting the cam strip 23 in the cam holder 24.

In Figs. 1 and 4 we have shown the cam holder carrying the same cam. It should be noted that this causes the external surface or turned contour of the work piece 20 to be just the reverse of the internal contour or bored surface of the work piece 19. This reverse shaping of internally bored and externally turned pieces may be desirable in some instances, but it will be understood that the face of the cam which is engaged by the follower may have any desired contour either for boring or turning.

By way of summary of the explanation of the set-up of the attachment and of its operation, it might be stated that when a piece is to be bored the parts of the cam holder are adjusted so that the lower side of the holder will engage the base of the slot 56 and slide freely thereover without tilting the bar during the movement of the slide 17 toward the head. Previously, of course, the pilot bar and the pilot bushing are adjusted so that the bar will be received freely in the bushing with the intended piloting action, and the follower is clamped in position with the wedge-shaped point or knife edge 40$^a$ rearwardly of the cam strip when the slide 17 is in its most rearward position: Just before the boring tool engages the work piece, the point of the follower will ride up onto the cam surface so as to be in position to guide the up and down movement of the tool slide and of the tool to cause it to give to the work piece the correct bored contour. As the slide 17 with the tool holder assembly moves forward during the boring operation, the wedge or knife edge point of the follower is constantly held in engagement with the cam by the pressure of the work on the tool and by the spring 42.

When the boring operation is completed the movement of the slide 17 is stopped with the knife edge of the follower just beyond the active part of the cam surface of the cam. Then the operator releases the follower by first backing off the screw 53 and swinging the clamping link upwardly, and then at the instant that the slide 17 starts rearwardly the follower turns to its inoperative position both by gravity and by reason of the upward pressure of the slide under the action of spring 42, the follower being so constructed that it normally tends to swing to its inoperative position. This movement of the follower is accompanied by a downward movement of the slide under the action of the spring 42, causing a movement of the tool from the bored surface so that the retraction of the slide 17 and tool assembly can proceed without causing the tool to score the work piece. Following the retraction of the slide 17, another work piece is inserted in the chuck, the follower is restored to its previous position, and the operation is repeated.

To convert the attachment for the turning operation, the cam holder 24 is removed from the cam arm 25 and is inverted either with the same cam 23 or with a different cam, depending upon the circumstances. Likewise, the follower is placed beneath the cam in the manner already explained and clamped in position. The plate 47 is removed and the bolt 44 is replaced by the bolt or plunger 45 used for the turning operation and the tool holder 38 is positioned properly to accommodate the work piece to be turned. The turning operation is now carried out, the cam and follower acting as before, but the top face of the cam holder now rides against the lower side of the plate 57, the follower together with the tool slide 39 being now pressed upwardly by the pressure of the work on the tool and by the pressure of the spring 42. On the completion of the turning operation, the follower is released by swinging and turning the lever 63, and at the beginning of the rearward movement of the slide 17 the follower swings to its inoperative position, and the slide is moved upwardly sufficiently to relieve the tool from the work piece, but the cam holder remains in its previous horizontal position by reason of the supporting set-screw 31.

It will be seen from the above that the adaptation of this attachment from a set-up for boring to one for turning or vice versa is a matter largely of a relocation of certain of the parts accompanied by a change in the cam (in some instances only), and a replacement only of one spring bolt for another in order that the spring which actuates the slide may be caused to normally urge the slide in a direction opposite that in which it acted in the other set up. In other words, the parts used in the set-up for turning are the same as those used in the set-up for boring, with the exception that one or two parts only must be replaced with others to enable the attachment to function in the desired manner for the particular cutting operation desired.

While we have shown the preferred embodiment of the invention, it will be obvious that changes may be made in the details of construction and arrangements of parts, and therefore we do not desire to be confined to the construction illustrated but aim in our claims to cover all modifications which do not involve a departure from the spirit and scope of the invention.

Having thus described our invention, we claim:

1. In a machine tool, a work holding member, a tool holding member, a cam, a follower engaging the cam and operatively connected to the tool holder, said follower being movable from an operative position to an inoperative position to relieve the tool from the work piece on the completion of a cut, and a movable retainer for normally holding the follower in operative position.

2. In a machine tool, a work holder, a tool holder movably mounted, a cam, a follower engaging the cam and connected to the tool holder, means acting on the tool holder to shift the same and thereby disengage the tool from the work piece, said means being resisted by the engagement of the follower with the cam, the follower being movably mounted so that it may move out of engagement with the cam and permit said means to become effective, and a movable retainer for normally holding the follower in operative position.

3. In a machine tool, a work holder, a tool holder movably mounted, a cam, a follower adapted to engage the cam and connected to the tool holder, a spring acting on the tool holder to shift the same so as to disengage the tool from the work piece, means whereby the follower may be moved to an inoperative position out of engagement with the cam so as to permit said spring to become effective, and a movable retainer for normally holding the follower in operative position.

4. In a machine tool, a work holder, a tool holder movably mounted, a cam, a follower connected with the tool holder, said follower being pivotally mounted whereby it may be moved into and out of engagement with the cam, and a movable retainer normally holding the follower in a position to engage the cam.

5. In a machine tool, a work holder, a tool holder in the form of a slide, a cam, a follower carried by the slide and adapted to engage the cam, said follower being movably supported by the slide whereby it may move into and out of engagement with the cam, and a movable retainer normally holding the follower in a position to engage the cam.

6. In a machine tool, a work holder, a tool holder in the form of a slide, a cam, a follower adapted to engage the cam, said follower being pivotally supported by the slide and adapted to be swung on its pivot to move it into and out of engagement with the cam, and a movable retainer normally holding the follower in a position to engage the cam.

7. In a machine tool, a work holder, a tool holder in the form of a slide, a spring tending to move the tool holder so as to disengage the tool from a work piece, a cam, a follower for the cam and by its engagement therewith serving to oppose the action of said spring, said follower being movably supported on the slide whereby it may be moved into and out of engagement with the cam, and a movable retainer normally holding the follower in a position to engage the cam.

8. In a machine tool, a work holder, a tool holder movably mounted, a cam adapted for boring or turning and variable as to the position of its active surface, and a follower engageable with the cam and connected with the tool holder, the follower being reversible in position whereby it may engage differently positioned cam surfaces to adapt the machine for both boring and turning.

9. In a machine tool, a work holder, a tool holder movably mounted and having a follower support, a cam, a follower carried by said support, and means whereby the follower may be supported at two different points on said support for engagement with differently positioned cam surfaces, one for boring and the other for turning.

10. In a machine tool, a work holder, a tool holder movably mounted, a cam, and a follower engageable with the cam and connected with the tool holder, the cam and follower being invertible whereby they may be positioned either for a boring operation or a turning operation.

11. In a machine tool, a work holder, a tool holder movably mounted and having a follower support, a cam, a follower engageable with the cam and carried by said support, means acting on the tool holder to move the same so as to disengage the tool from the work piece, the action of said means being opposed by the engagement of the follower with the cam, and means whereby the follower may be supported in two different positions on said support whereby it is adapted for both boring and turning.

12. In a machine tool, a work holder, a tool holder movably mounted, a cam, a follower engageable with the cam, and a spring acting on the tool holder to shift the same and opposed by the engagement of the follower with the cam, both the cam and the follower being invertible whereby the follower may engage two oppositely disposed cam surfaces, one for one species of cutting and the other for another species of cutting.

13. In a machine tool, a head having a rotatable work carrying member, a slide movable toward and from the head, brackets supported by the head and slide, the bracket carried by the slide having a movable tool carrying member, the bracket carried by the head having a cam and the movable tool carrying member having a follower engageable therewith, and one of the brackets having a pilot adapted to slidingly engage the other bracket.

14. An attachment for a machine tool which has a bed, a head and a slide movable on the bed toward and from the head, said attachment comprising a pair of brackets one adapted to be supported by the head and the other by the slide and one having a movable tool holder, a cam and a follower, one carried by one bracket and the other connected with the tool holder, and a pilot bar carried by one bracket and engageable with the other.

15. An attachment for machine tools of the type having a bed, a head and a slide movable on the bed toward and from the head, said attachment comprising a pair of brackets, one for attachment to the head and the other to the slide, a cam holder and a pilot bar, both adapted to extend between said brackets, and a follower connected with the tool holder and adapted to engage a cam on the cam holder.

16. An attachment for a machine tool for cutting irregular surfaces on a work piece, said attachment comprising a pair of brackets adapted to be attached respectively to the work and tool holding members of the machine tool, one bracket being adapted to support a cam and the other having a movable tool holder, a follower engageable with the cam, and spring means acting on the movable tool holder so as to tend to move the same in one direction or in a direction opposite thereto, depending upon the relative positions of the cam and follower.

17. A machine tool having a bed, a head on the bed provided with a bracket, a tool holding member slidable on the bed and provided with a bracket having a tool carrying slide, a cam supported by the bracket on the head, and a follower carried by the slide and engageable with the cam, said follower being movable from an operative position to an inoperative position to relieve the tool from the work piece on the completion of the cut.

18. An attachment applicable for machine tools and adaptable for cutting irregular surfaces, said attachment comprising two members adapted to be applied to the work and tool holding elements of the machine tool, one of said members having a cam and the other having a movable tool holder with a follower engageable with the cam, provision being made for causing the follower to engage either an outwardly or an inwardly positioned cam surface, and spring means acting on the movable tool holder and serving to move the tool holder either in one direction or in a direction opposite thereto depending upon the relative positions of the cam and follower, the tool holder having separate abutments engageable with the spring means to cause the latter to move the tool holder in opposite directions.

19. An attachment for machine tools adaptable for cutting irregular surfaces comprising two members adapted to be applied to the work and tool carrying elements of the machine tool, one member having a cam and the other having a movable tool holder with a follower engageable with the cam, and means for holding the follower in engagement with the cam, the cam and the follower being invertible and the said means being reversible in the direction in which it acts.

20. An attachment for machine tools adaptable for cutting irregular surfaces, said attachment comprising a pair of brackets adapted to be attached to work and tool holding elements of the machine tool, one of the brackets having a cam holder and the other having a movable tool holder with a follower, said cam holder comprising a member adjustably attached to its bracket and having a member pivoted thereto adjustable as to length, said member being adapted to receive the cam.

21. An attachment for machine tools adaptable for cutting irregular surfaces, said attachment comprising a pair of members adapted to be applied to the work and tool holding elements of the machine tool, one of said members having a cam and the other having a movable tool holder carrying a follower engageable with the cam, the follower being movably supported on the tool holder, and a movable retainer for rigidly holding it in operative position.

22. An attachment for machine tools adaptable for cutting irregular surfaces, said attachment comprising a pair of members adapted to be applied to the work and tool holding elements of the machine tool, one of said members having a cam and the other having a movable tool holder carrying a follower engageable with the cam, the tool holder having provision for supporting the follower in two different positions thereon, and means for rigidly holding it when in either position and for releasing it whereby it may move to an inoperative position.

In testimony whereof, we hereunto affix our signatures.

LESTER M. COLE.
EDMUND H. HALTER.
ROBERT H. LEWIS.